H. L. HOPKINS.
MOWER AND HARVESTER.
APPLICATION FILED JUNE 19, 1905.
959,535.
Patented May 31, 1910.
3 SHEETS—SHEET 1.
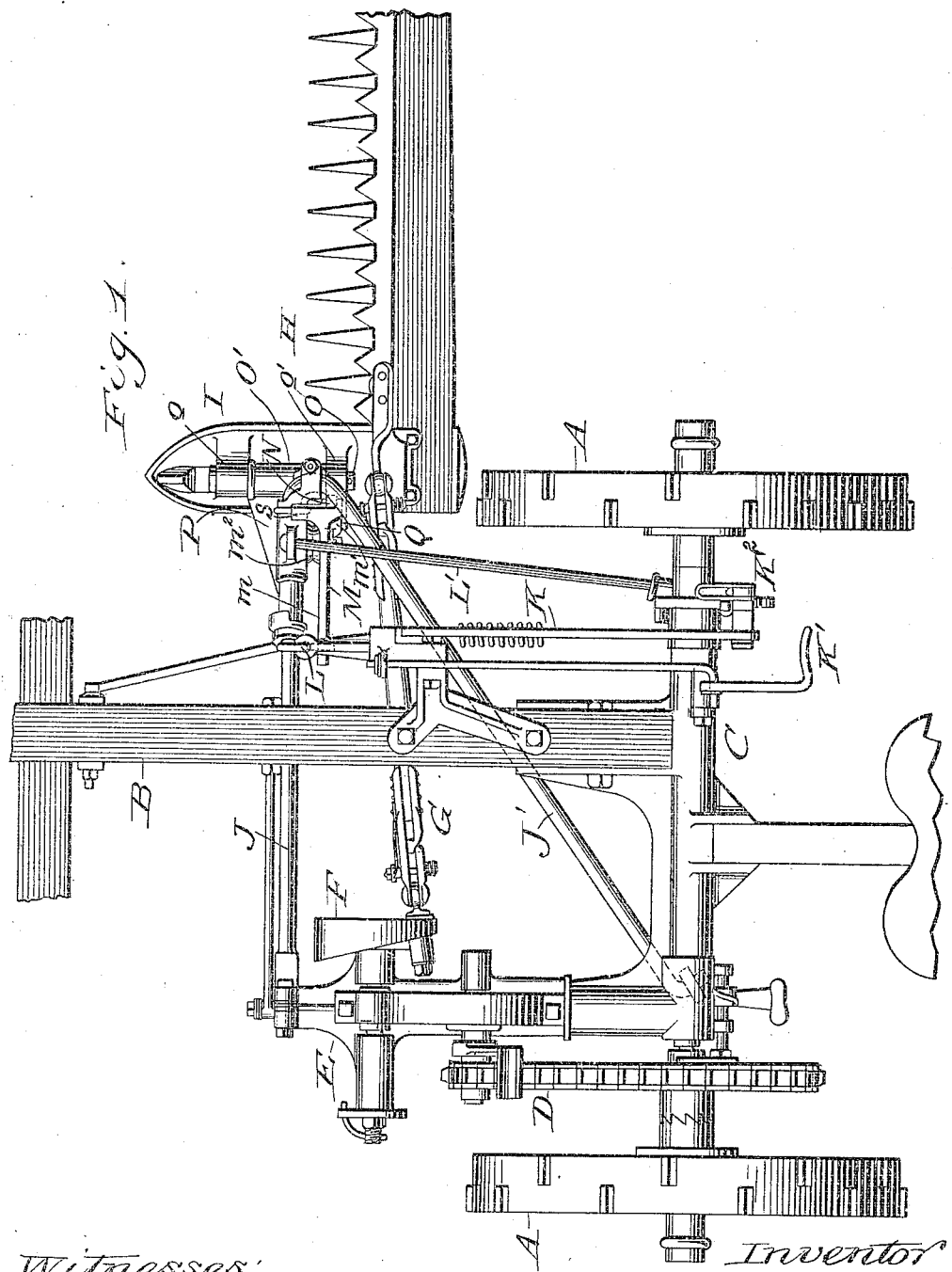
Witnesses:
Inventor
Harvey L. Hopkins.
Atty.

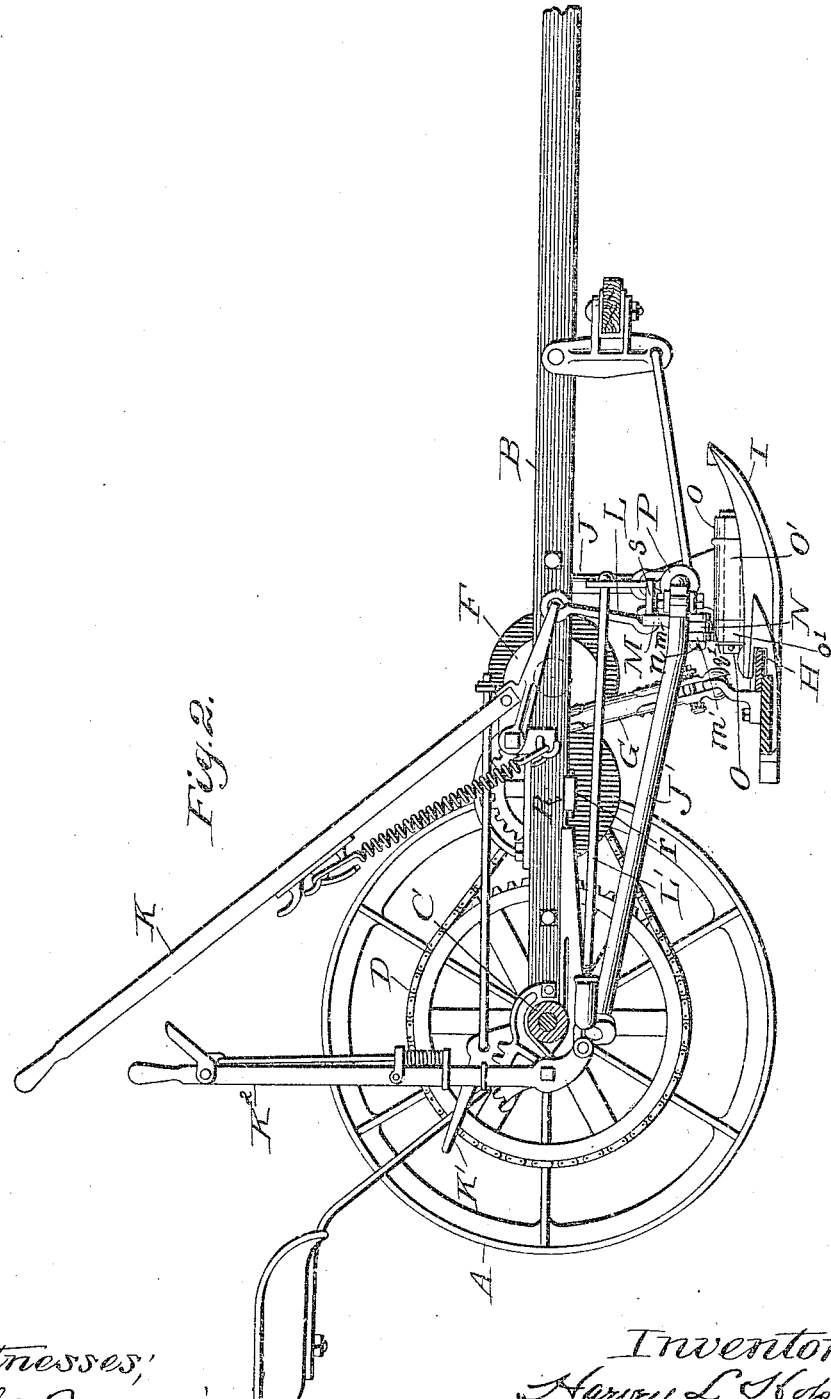

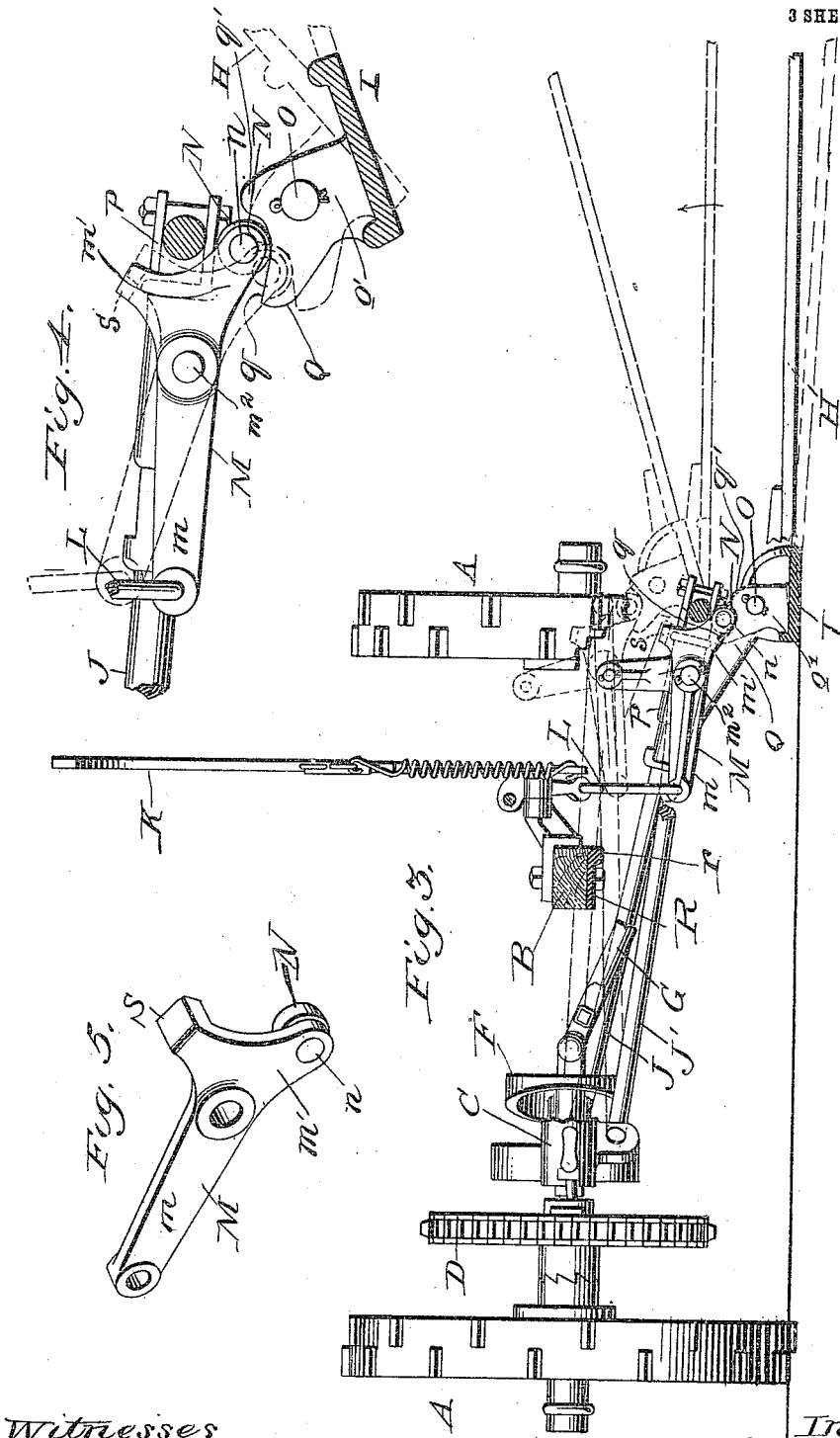

UNITED STATES PATENT OFFICE.

HARVEY L. HOPKINS, OF CHICAGO, ILLINOIS, ASSIGNOR TO HOPKINS PATENT COMPANY, A CORPORATION OF ILLINOIS.

MOWER AND HARVESTER.

959,535.  Specification of Letters Patent.  Patented May 31, 1910.

Application filed June 19, 1905. Serial No. 266,033.

*To all whom it may concern:*

Be it known that I, HARVEY L. HOPKINS, a citizen of the United States, residing at Chicago, in the county of Cook and State of Illinois, have invented certain new and useful Improvements in Mowers and Harvesters, of which the following is a specification, reference being had therein to the accompanying drawing.

This invention relates to improvements in mowing machines, pertaining more particularly to that part of these machines which is used for regulating the relative position of the cutting apparatus when at work, and for adjusting it from one position to another, and holding and controlling it.

Figure 1 is a plan view of a mowing machine containing parts embodying my improvement. Fig. 2 is a side elevation looking from the grass side, the cutting apparatus being shown in section. Fig. 3 shows in rear elevation the lifting apparatus, with some of the other adjacent or connected parts. Fig. 4 is also a rear view of the same parts, showing the cutting apparatus and its lifting mechanism in different positions. Fig. 5 is a perspective view of the gag lever.

In the drawings I have shown a mowing machine in plan view in Fig. 1, more or less complete, but it will not be necessary to here describe it as an entirety, or all of its details, first, because I have shown in my earlier application, No. 246,533, filed February 20, 1905, a machine similar to that indicated herein, except as to the parts to which the present invention relates, and, secondly, because the present improvements are applicable to any of many styles of mowing and reaping machines. Suffice it to say, for the purposes of this specification, that A A represent the ground wheels or driving wheels, B the tongue, C the main axle and cross connecting parts, D the train of gearing, extending to the crank shaft at E, F the crank or crank disk, G the power transmitting pitman, H the cutting apparatus, I the shoe, J, J′ the swinging connecting frame which joins the shoe and cutting apparatus to the main frame, K the manual lifting lever, K′ the foot lever connected therewith, $K^2$ the tilting lever, L the link connecting the lifting lever with the gag lever, and L′ the link extending forward from the tilting lever to the devices immediately connected with the cutting apparatus.

M indicates, as an entirety, the lever which in mechanisms of this class is generally termed the gag lever. It is constructed and mounted as follows: It has an arm $m$, relatively long, and connected to the lower end of the link L. It has also a shorter arm $m'$, the pivot pin upon which it is mounted being shown at $m^2$.

N is a roller mounted on the pintle $n$, secured to the forward shorter arm $m'$.

The shoe I is supported by the hinge pin O, this being fitted in ears $o$, $o'$ on the shoe, and a sleeve bearing O′ suspended from a loose sleeve P, mounted on the arm J of the connecting frame J, J′.

Q is a cam-like arm on the shoe preferably provided by extending upward and outward the metal of the ear $o'$. This arm Q lies in the transverse vertical plane of the short arm $m'$ of the gag lever and the roller N carried thereby. These two parts are so co-related that when the arm $m$ of the lever is drawn upward it forces the short arm and the roller N downward, and they, in turn, engage with and bear upon the upward inclined surface $q$ on the cam arm Q, and when power is applied to the lever a tilting movement of the shoe and the cutting apparatus around the hinge pin O can be caused.

When lifting power is exerted on the lever K, it is transmitted through the link L to the gag lever and the parts connected thereto. The two parts of the apparatus subject to the influence of this lifting force are the connecting frame J, J′ and the cutting apparatus hinged thereto. The weights and leverages are so related to each other that the first effect produced on moving the lever K is to apply some of the lifting action to the cutting apparatus, which, if inclined downward toward its outer end, begins to tilt or rock around the axis of the hinge at O and to approach a horizontal position. As soon as this position of the cutting apparatus, that is one approximately horizontal, is attained the resistance from the outer end of the cutting apparatus is felt and the parts come to a balance, and then the whole system (the connecting frame J, J′ and the cutting apparatus) begins to rise around the line of the hinges at the ends of the arms J, and J′ the cutting apparatus during such movement remaining substantially horizontal. In order to limit this general movement of the two parts, together, of the system, I have combined with the machine a stop device, which I place in the vertical path of the frame J, J'. A stop of the character referred to is shown at R, it consisting of a plate secured to the under side of the tongue or main frame, and having a lug or projection r extending down to the proper horizontal line. There may be a stop of this character immediately above the arms J, J' of the connecting frame, but I have found a single stop above the arm J' to be sufficient. The dimensions and position of this stop are so related to the other factors of the mechanism that after it is impinged on by the frame J, J' and causes the connecting frame to come to rest, there shall still be a lifting effect incident to the gag lever and the cam Q. That is to say, when the frame J, J' is stopped there is still a further movement possible for the gag lever and under the force transmitted from the lifting lever K, a further movement upward of the cutting apparatus can be caused by the travel of the roller N up the incline of the cam Q. The roller and the incline of the cam allow the outer end of the cutting apparatus to lower when the lifting lever is released. When the cutting apparatus is in its lowermost position, that is with its outer end lower than the inner end of the shoe I, a downward pressure on the hand lever K will cause the roller N to travel along the incline, and this action first raises the outer end of the cutting apparatus independently of the inner end, bringing the cutters to a level position; then the continued movement of the hand lever raises the cutting apparatus bodily. In practice, it is important that the cutting apparatus be thus raised bodily to the height of the inner shoe I so as to cut an even stubble when the parts are in this position. When this limit has been reached the outer end of the cutting apparatus requires to be raised higher than the inner end so that it will be clear of the ground when the driving wheels are on an uneven surface as when the wheel on the stubble side is in an elevation and the wheel on the grass side is in a depression, either or both. This extra elevation of the outer end of the cutting apparatus can be caused by the arm J' of the connecting frame coming in contact with the stop R when it is being raised with the cutting apparatus, and by the continuing of the action of the lifting lever K, thus causing the roller to continue its pressure against the incline of the cam Q. This action of the gag lever and the cam continues the raising of the outer end of the cutting apparatus, after the inner end has been stopped from rising by contact with the stop R.

It will be noted that the cam Q is not connected to the roller or to the gag lever, but can move downward therefrom, so that the cutting apparatus can be thrown still farther around the hinge at O, after the limit of action of the lifting mechanism on the connecting frame has been reached. This can be done by hand, as when it is desired to throw the cutting apparatus over into the position occupied when it is to be transported from place to place without its being in operation.

The gag lever has a laterally extended, forwardly turned stop arm S, which lies above a suitable part which is stationary relatively to the gag lever, as, for instance, above the frame bar J, or about the sleeve P mounted thereon. This serves as a final stop for the action of the gag lever. That is to say, after the connecting frame J, J' has reached its upper limit, the cutting apparatus can be raised still farther by the hand lever through the gag lever, until this projecting arm S strikes the stationary part, (as sleeve P) at which time the cutting apparatus is in the position shown in dotted lines in Fig. 4. The distance of the arm or projection S from the sleeve P or other stop, can be varied to meet any desired conditions and limits. When the machine is in operation this distance is increasing and decreasing during the movements of the cutting apparatus; increasing when the outer end is lower than the inner end, and decreasing when it is higher than the inner end.

Any desired action, movement or limit of movement may be obtained in practice by providing one inclination or another for the cam surface at q; by providing one position or another for the stop R; and one position or another for the stop projection S. Furthermore, the cam Q may be provided with a lug q' adapted to limit the outward or downward travel of the roller N along the cam surface q. If desired the roller N may be held stationary so that it cannot turn, but that its axle pin can turn within it. This will produce some results that may be required at times.

The relations, as to leverage, between the gag lever M and the projection or cam surface of the cutting apparatus with which it engages are such that when the finger bar inclines downward toward its outer end the gag lever acts to greater advantage than when the cutting apparatus assumes a horizontal position. When in this latter position the parts are balanced, that is to say, a pull on the longer arm of the gag lever, which, as has been described, is pivoted on a movable frame J, J', will not rock the gag lever but instead will lift it bodily, together with the frame to which it is pivoted and the connected parts, thus carrying the cutting apparatus upward while maintained in a substantially constant plane, with reference to the horizon.

Of course it will be understood that my invention does not consist in the axact relations of the parts for tilting the cutting apparatus shown in the drawings, as these may be varied so long as the result attained is accomplished; for instance, the lengthening of the arm $m'$ of the gag lever, would require a shortening of the arm or contact surface with which it engages. Again, the relation of these parts may easily be changed by varying the curvature of the cam surface Q so that when the parts come to balance the finger bar will incline slightly either upward or downward from the horizontal. But as these matters are such as come within the province of the skilled mechanic, they need not be further illustrated or described herein.

I prefer that the movable frame to which the cutting apparatus is connected, should be free to move upward, when the parts are in balance, as has been described, far enough to cause a lifting of the cutting apparatus about six inches. When that elevation has been attained the stop R comes into action, and the continued movement of the lifting lever then causes a further upward tilting of the cutting apparatus relative to the connecting frame, this continuing until the stop S on the gag lever arrests further movement.

What I claim is:

1. In a harvester or mower, the combination with the frame, the cutting apparatus and the lifting mechanism, of the gag lever, and the cam on the cutting apparatus, the cam having an upwardly and stubbleward inclined operative face, with which the gag lever is arranged to engage, the cam being constructed and arranged to first cause a moving upward of the outer end of the cutting apparatus, and then, without locking the same, to cause a bodily lifting of the entire cutting apparatus, substantially as set forth.

2. In a harvester or mower, the combination with a main frame, a cutting apparatus, a swinging connecting frame mounted on the main frame and pivotally connected to the cutting apparatus, and lifting mechanism, of a gag lever and an abutment or projection with which the gag lever engages carried by the cutting apparatus, the leverage relations between these parts being substantially as described, whereby the gag lever acts upon the cutting apparatus to tilt it upward with greater efficiency when the latter is inclined downward toward its outer end than when it occupies a substantially horizontal position, in which latter position the parts are substantially at a balance without being locked, permitting the cutting apparatus to be bodily lifted without changing its inclination.

3. In a harvester or mower, the combination of a main frame, a swinging coupling frame mounted on the main frame, a cutting apparatus hinged to the coupling frame, a lifting lever, a gag lever fulcrumed on the coupling frame and connected to the lifting lever, a roller mounted on the gag lever, a lever projection carried by the cutting apparatus and having a surface with which the said roller engages, the form and relation of the gag lever and cutting apparatus parts being such that the mechanical advantage of the gag lever decreases as the outer end of the cutting apparatus moves upward to the level of its inner end, whereby the application of power to the gag lever may cause the outer end of the cutting apparatus to be swung upward to approximately the level of its inner end, at which point the parts become so balanced that continued application of power to the gag lever causes the cutting apparatus to be bodily lifted with the coupling frame without being tilted, substantially as set forth.

4. In a mower or harvester, the combination of a main frame, a cutting apparatus, a swinging coupling frame mounted on the main frame and pivotally connected to the cutting apparatus, a lifting lever, a gag lever connected with the lifting lever and supported by the coupling frame and adapted to transmit power to elevate the latter relative to the main frame, a projection carried by the cutting apparatus with which the gag lever engages, the leverage relations between the gag lever and the projection it engages being substantially such as described, whereby the cutting apparatus will be rocked into a substantially horizontal position when power is applied to the lifting lever, when the parts will come to a substantial balance and further movement of the lifting lever will lift the coupling frame, a stop for arresting the movement of the coupling frame, the cutting apparatus being free to be further tilted by the gag lever after the coupling frame comes to rest, and a stop for limiting the operation of the gag lever on the said projection.

5. In a harvester or mower, the combination of a main frame, a pivoted coupling frame, a cutting apparatus hinged to the coupling frame, a gag lever fulcrumed on the coupling frame, a projection carried by the cutting apparatus upon which the gag lever bears, the cutting apparatus being free to follow the ground and have its end inclined or dropped down below its hinged end, and the weight and leverage relations of the gag lever, coupling frame, and cutting apparatus being substantially as described, whereby when power is applied to the gag lever the outer end of the cutting apparatus is first lifted, and this apparatus brought into a substantially horizontal position, and then the cutting apparatus is bodily lifted with the coupling frame without being further tilted, and means for arresting the joint upward movement of the parts while allowing a further upward tilting of the cutting apparatus, substantially as set forth.

6. In a harvester or mower, the combination of a main frame, a coupling frame pivoted or hinged to the main frame, a cutting apparatus hinged to the coupling frame, a gag lever fulcrumed on the coupling frame, a stop which limits the pivotal movement of the gag lever in one direction, a projection carried by the cutting apparatus upon which the gag lever bears, the engagement of the gag lever and bearing projection being such that the cutting apparatus may be freely moved or swung upward irrespective of the gag lever, and the weight and leverage relations of the gag lever, coupling frame, and cutting apparatus, being substantially as described, whereby when power is applied to the gag lever, the cutting apparatus is brought to an approximately horizontal position and balanced before the gag lever is moved far enough to be arrested by the said stop, and when so held the coupling frame and the cutting apparatus may be lifted together by power applied to the gag lever, substantially as set forth.

7. In a harvester or mower, the combination of a main frame, a swinging coupling frame mounted on the main frame, a cutting apparatus hinged to the coupling frame, a lifting lever, a gag lever fulcrumed on the coupling frame and connected to said lifting lever, a projection carried by the cutting apparatus with which the gag lever operatively connects, the weight and leverage relations of the gag lever, coupling frame and cutting apparatus being such that when power is applied to the gag lever, the outer end of the cutting apparatus is first lifted to bring this apparatus into an approximately horizontal position and then the cutting apparatus is bodily lifted with the coupling frame without being further tilted, substantially as set forth.

In testimony whereof I affix my signature, in presence of two witnesses.

HARVEY L. HOPKINS.

Witnesses:
S. EDITH HAWE,
CHAS. H. POPE.